United States Patent
Xu

(10) Patent No.: US 11,568,225 B2
(45) Date of Patent: Jan. 31, 2023

(54) SIGNAL PROCESSING SYSTEM AND METHOD

(71) Applicant: Huawei Technologies Co., Ltd., Shenzhen (CN)

(72) Inventor: Ruosheng Xu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 543 days.

(21) Appl. No.: 16/705,464

(22) Filed: Dec. 6, 2019

(65) Prior Publication Data

US 2020/0110989 A1   Apr. 9, 2020

Related U.S. Application Data

(63) Continuation of application No. PCT/CN2018/092052, filed on Jun. 20, 2018.

(30) Foreign Application Priority Data

Jun. 30, 2017  (CN) .......................... 201710525239.4

(51) Int. Cl.
 *G06N 3/063* (2006.01)
 *G06F 7/523* (2006.01)
 *G06F 17/16* (2006.01)

(52) U.S. Cl.
 CPC ............. *G06N 3/063* (2013.01); *G06F 7/523* (2013.01); *G06F 17/16* (2013.01)

(58) Field of Classification Search
 CPC ...... G06N 3/063; G06N 3/0445; G06F 17/16; G06F 7/523
 USPC .......................................................... 706/41
 See application file for complete search history.

(56) References Cited

U.S. PATENT DOCUMENTS

| 2015/0379423 A1 | 12/2015 | Dirac et al. |
| 2016/0275395 A1 | 9/2016 | Amir et al. |

FOREIGN PATENT DOCUMENTS

| CN | 1323103 A | 11/2001 |
| CN | 101355541 A | 1/2009 |
| CN | 103490848 A | 1/2014 |
| CN | 103997592 A | 8/2014 |

(Continued)

OTHER PUBLICATIONS

Magoarou, L., et al., "Flexible Multi-layer Sparse Approximations of Matrices and Applications," XP011610087, IEEE Journal of Selected Topics in Signal Processing, vol. 10, No. 4, Jun. 2016, pp. 688-700.

(Continued)

*Primary Examiner* — Tan V Mai

(74) *Attorney, Agent, or Firm* — Conley Rose, P.C.

(57) ABSTRACT

A signal processing method and apparatus, where the apparatus includes an input interface configured to receive an input signal matrix and a weight matrix, a processor configured to interleave the input signal matrix to obtain an interleaved signal matrix, partition the interleaved signal matrix, interleave the weight matrix to obtain an interleaved weight matrix, process the interleaved weight matrix to obtain a plurality of sparsified partitioned weight matrices, perform matrix multiplication on the sparsified partitioned weight matrices and a plurality of partitioned signal matrices to obtain a plurality of matrix multiplication results, and an output interface configured to output a signal processing result.

17 Claims, 10 Drawing Sheets

(56) References Cited

FOREIGN PATENT DOCUMENTS

| CN | 104573738 A | 4/2015 | |
|---|---|---|---|
| CN | 104899182 A | 9/2015 | |
| CN | 104915322 A | 9/2015 | |
| CN | 105260776 A | 1/2016 | |
| CN | 106126481 A | 11/2016 | |
| CN | 106663224 A | 5/2017 | |
| WO | WO-2021058578 A1 * | 4/2021 | ........... G06N 3/0454 |

OTHER PUBLICATIONS

Kim, Y., et al., "Compression of Deep Convolutional Neural Networks for Fast and Low Power Mobile Applications," XP055396146, Published as a conference paper at ICLR 2016, 16 pages.

Han, S., et la., "ESE: Efficient Speech Recognition Engine with Compressed LSTM on FPGA," NIPS 2016, 6 pages.

* cited by examiner

Before interleaving          After interleaving

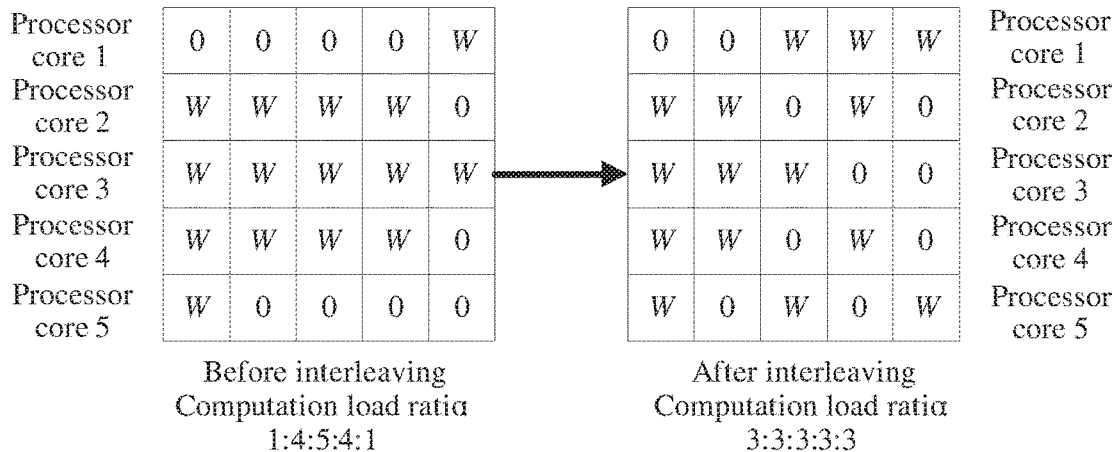
FIG. 6
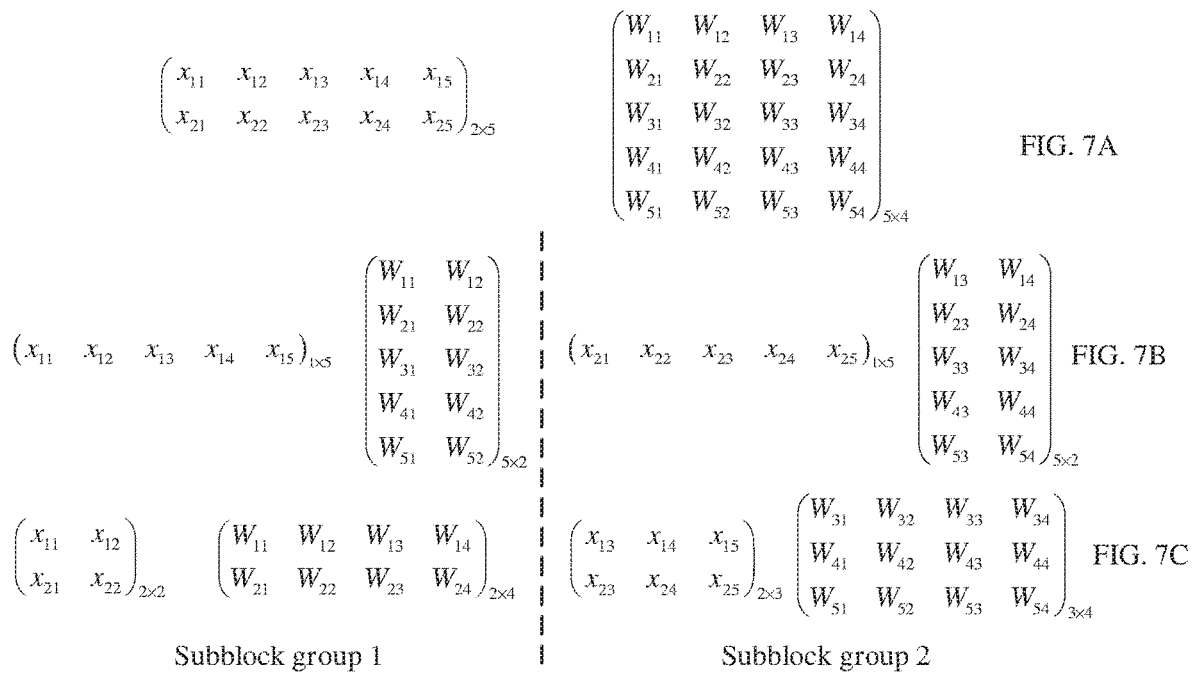

$$\begin{pmatrix} x_{11} & x_{12} & x_{13} & x_{14} & x_{15} \\ x_{21} & x_{22} & x_{23} & x_{24} & x_{25} \end{pmatrix}_{2\times 5} \qquad \begin{pmatrix} W_{11} & W_{12} & W_{13} & W_{14} \\ W_{21} & W_{22} & W_{23} & W_{24} \\ W_{31} & W_{32} & W_{33} & W_{34} \\ W_{41} & W_{42} & W_{43} & W_{44} \\ W_{51} & W_{52} & W_{53} & W_{54} \end{pmatrix}_{5\times 4}$$

Subblock group 1

$$(x_{11} \quad x_{12} \quad x_{21} \quad x_{22} \quad x_{23})_{1\times 5} \qquad \begin{pmatrix} W_{11} & W_{23} \\ W_{21} & W_{33} \\ W_{12} & W_{14} \\ W_{22} & W_{24} \\ W_{13} & W_{34} \end{pmatrix}_{5\times 2} \begin{pmatrix} W_{31} & W_{52} \\ W_{41} & W_{43} \\ W_{51} & W_{53} \\ W_{32} & W_{44} \\ W_{42} & W_{54} \end{pmatrix}_{5\times 2}$$

$$(x_{13} \quad x_{14} \quad x_{15} \quad x_{24} \quad x_{25})_{1\times 5}$$

Subblock group 2

FIG. 8

SIGNAL PROCESSING SYSTEM AND METHOD

CROSS-REFERENCE TO RELATED APPLICATIONS

This application is a continuation of International Patent Application No. PCT/CN2018/092052 filed on Jun. 20, 2018, which claims priority to Chinese Patent Application No. 201710525239.4 filed on Jun. 30, 2017. The disclosures of the aforementioned applications are hereby incorporated by reference in their entireties.

TECHNICAL FIELD

This application relates to the field of artificial intelligence, and in particular, to a signaling processing system and method.

BACKGROUND

An artificial neural network (ANN), or a neural network (NN), is a network structure that imitates behavior characteristics of an animal NN for information processing. The structure includes a large quantity of nodes (or neurons) connected to each other, and learns and trains input information based on a specific computational model to process information. An NN includes an input layer, a hidden layer and an output layer. The input layer is responsible for receiving an input signal, the output layer is responsible for outputting a calculation result of the NN, and the hidden layer is responsible for a calculation process, for example, learning and training. The hidden layer is a memory unit of the network, and a memory function of the hidden layer is represented by a weight matrix.

A recurrent NN (RNN) is a type of NN. A hidden layer of the RNN has a specific recurrent feedback mechanism, neurons are connected to each other, and the hidden layer has a function of memorizing historical input information. Usually, there are thousands of neurons at each hidden layer, and a size of a weight matrix is much larger than a capacity of a NN hardware processor. Therefore, the weight matrix is stored in an external memory. An operation of reading the weight matrix from the external memory greatly increases a bandwidth requirement of the processor and processing power consumption of the RNN.

A common solution to address an issue of an oversized weight matrix is to sparsify the weight matrix, that is, to set elements of the weight matrix smaller than a preset threshold to zero. While reducing the size of the weight matrix, this sparsification solution leads to uneven distribution of non-zero parameters in the weight matrix. As computation of the weight matrix is usually performed concurrently by a plurality of processor cores, uneven distribution of non-zero parameters in the weight matrix causes an uneven computation load on each processor core and low utilization of a computing resource, which reduces computation efficiency of the NN.

To address the foregoing issue, a solution is to adjust a sparsification policy by setting an adaptive sparsification threshold such that distribution of the non-zero parameters in the sparsified weight matrix tends to be even, and the computation load tends to be even on each processor core. However, selection of the adaptive threshold is strongly related to a quantity of processor cores, and sparsification solutions for different processor specifications need to be adjusted accordingly, which increases computation complexity. Moreover, it is impossible that key weights should be evenly distributed, and changing the threshold to forcibly achieve even distribution of the key weights may degrade performance of the NN.

SUMMARY

Embodiments of this application provide a signal processing system and method, to improve computation efficiency of an NN.

In view of this, a first aspect of this application provides a signal processing method. The method includes receiving an input signal matrix, where the input signal matrix includes a plurality of to-be-processed signals that can be processed by a computer, receiving a weight matrix, where the weight matrix includes a plurality of weight coefficients, interleaving the input signal matrix to obtain an interleaved signal matrix, partitioning the interleaved signal matrix to obtain a plurality of partitioned signal matrices, interleaving the weight matrix to obtain an interleaved weight matrix, processing the interleaved weight matrix to obtain a plurality of sparsified partitioned weight matrices, performing matrix multiplication on the plurality of sparsified partitioned weight matrices and the plurality of partitioned signal matrices to obtain a plurality of matrix multiplication results, where matrix multiplication is performed on each sparsified partitioned weight matrix and a partitioned signal matrix corresponding to the sparsified partitioned weight matrix to obtain a matrix multiplication result, and each matrix multiplication result includes a plurality of output signals that can be processed by the computer, and outputting a signal processing result, where the signal processing result includes the plurality of matrix multiplication results.

In a possible design, processing on the interleaved weight matrix includes first partitioning the interleaved weight matrix to obtain a plurality of partitioned weight matrices, and then sparsifying the plurality of partitioned weight matrices to obtain the plurality of sparsified partitioned weight matrices.

In a possible design, processing on the interleaved weight matrix includes first sparsifying the interleaved weight matrix to obtain a sparsified weight matrix, and then partitioning the sparsified weight matrix to obtain the plurality of sparsified partitioned weight matrices.

In a possible design, interleaving the input signal matrix and interleaving the weight matrix comply with a same interleaving rule.

In a possible design, the to-be-processed signals include at least one of a voice signal, a text signal, or an image signal.

In a possible design, the input signal matrix comes from an input layer or an intermediate layer of an NN.

In a possible design, the signal processing result goes to an output layer or the intermediate layer of the NN.

In a possible design, the plurality of partitioned signal matrices and the plurality of sparsified partitioned weight matrices satisfy a matrix multiplication rule.

In a possible design, a quantity of the plurality of partitioned signal matrices is the same as a quantity of the plurality of sparsified partitioned weight matrices.

In a possible design, the method further includes combining the plurality of matrix multiplication results to obtain the signal processing result.

In a possible design, outputting a signal processing result includes outputting the plurality of matrix multiplication results as a whole to form the signal processing result.

A second aspect of this application provides a signal processing apparatus, including a first input module configured to receive an input signal matrix, where the input signal matrix includes a plurality of to-be-processed signals that can be processed by a computer, a second input module configured to receive a weight matrix, where the weight matrix includes a plurality of weight coefficients, a first interleaving module configured to interleave the input signal matrix to obtain an interleaved signal matrix, a first partitioning module configured to partition the interleaved signal matrix to obtain a plurality of partitioned signal matrices, a second interleaving module configured to interleave the weight matrix to obtain an interleaved weight matrix, a processing module configured to process the interleaved weight matrix to obtain a plurality of sparsified partitioned weight matrices, a matrix multiplication module configured to perform matrix multiplication on the plurality of sparsified partitioned weight matrices and the plurality of partitioned signal matrices to obtain a plurality of matrix multiplication results, where matrix multiplication is performed on each sparsified partitioned weight matrix and a partitioned signal matrix corresponding to the sparsified partitioned weight matrix to obtain a matrix multiplication result, and each matrix multiplication result includes a plurality of output signals that can be processed by the computer, and an output module configured to output a signal processing result, where the signal processing result includes the plurality of matrix multiplication results.

In a possible design, the processing module that processes the interleaved weight matrix includes a second partitioning module and a sparsification module, where the second partitioning module is located before the sparsification module, and the second partitioning module first partitions the interleaved weight matrix to obtain a plurality of partitioned weight matrices, and then the sparsification module sparsifies the plurality of partitioned weight matrices to obtain the plurality of sparsified partitioned weight matrices.

In a possible design, the processing module that processes the interleaved weight matrix may further include a second partitioning module and a sparsification module, where the sparsification module is located before the second partitioning module, and the sparsification module first sparsifies the interleaved weight matrix to obtain a sparsified weight matrix, and then the second partitioning module partitions the sparsified weight matrix to obtain the plurality of sparsified partitioned weight matrices.

In a possible design, the first interleaving module and the second interleaving module comply with a same interleaving rule.

In a possible design, the to-be-processed signals include at least one of a voice signal, a text signal, or an image signal.

In a possible design, the input signal matrix comes from an input layer or an intermediate layer of an NN.

In a possible design, the signal processing result goes to an output layer or the intermediate layer of the NN.

In a possible design, the first partitioning module and the second partitioning module comply with a same partitioning rule.

In a possible design, the plurality of partitioned signal matrices and the plurality of sparsified partitioned weight matrices satisfy a matrix multiplication rule.

A third aspect of this application provides a signal processing apparatus, including an input interface configured to receive an input signal matrix, where the input signal matrix includes a plurality of to-be-processed signals that can be processed by a computer, and receive a weight matrix, where the weight matrix includes a plurality of weight coefficients, a processor configured to perform the following operations interleaving the input signal matrix to obtain an interleaved signal matrix, partitioning the interleaved signal matrix to obtain a plurality of partitioned signal matrices, interleaving the weight matrix to obtain an interleaved weight matrix, processing the interleaved weight matrix to obtain a plurality of sparsified partitioned weight matrices, and performing matrix multiplication on the plurality of sparsified partitioned weight matrices and the plurality of partitioned signal matrices to obtain a plurality of matrix multiplication results, where matrix multiplication is performed on each sparsified partitioned weight matrix and a partitioned signal matrix corresponding to the sparsified partitioned weight matrix to obtain a matrix multiplication result, and each matrix multiplication result includes a plurality of output signals that can be processed by the computer, and an output interface configured to output a signal processing result, where the signal processing result includes the plurality of matrix multiplication results.

In a possible design, the processing the interleaved weight matrix to obtain a plurality of sparsified partitioned weight matrices includes first processing the interleaved weight matrix to obtain a plurality of partitioned weight matrices, and then sparsifying the plurality of partitioned weight matrices to obtain the plurality of sparsified partitioned weight matrices.

In a possible design, the processing the interleaved weight matrix to obtain a plurality of sparsified partitioned weight matrices includes first sparsifying the interleaved weight matrix to obtain a sparsified weight matrix, and then partitioning the sparsified weight matrix to obtain the plurality of sparsified partitioned weight matrices.

In a possible design, interleaving the input signal matrix and interleaving the weight matrix comply with a same interleaving rule.

In a possible design, the to-be-processed signals include at east one of a voice signal, a text signal, or an image signal.

In a possible design, the input signal matrix comes from the input interface or an upper-level processor.

In a possible design, the signal processing result goes to the output interface or a lower-level processor.

In a possible design, the input interface may be configured to receive the input signal matrix and the weight matrix through time division multiplexing.

In a possible design, the signal processing apparatus may further include a memory, where the memory is configured to store a computer instruction, and the computer instruction is used to drive the processor to perform the foregoing operations.

In a possible design, the memory apparatus includes at least one of a computer readable storage medium, a floppy disk device, a hard disk device, an optical disk device, or a disk device.

A fourth aspect of this application provides a computer readable storage medium, where the computer readable storage medium stores an instruction, and when the instruction is run on a computer, the computer is enabled to perform the method in the first aspect.

A fifth aspect of this application provides a computer program product including an instruction, where when the computer program product runs on a computer, the computer is enabled to perform the method in the first aspect.

It can be learned from the foregoing technical solutions that the embodiments of this application have the following advantages. The weight matrix is interleaved first and then partitioned and sparsified. Therefore, key weight parameters tend to be evenly distributed in each sparsified partitioned weight matrix. This resolves a problem that uneven distribution of non-zero parameters in the weight matrix decreases computation efficiency of the NN, without increasing computational complexity and consequently causing performance degradation of the NN.

BRIEF DESCRIPTION OF DRAWINGS

FIG. 6 is a schematic diagram of another interleaving process according to an embodiment of this application;

FIGS. 7A, 7B and 7C are schematic diagrams of a partitioning process according to an embodiment of this application;

FIG. 8 is a schematic diagram of another partitioning process according to an embodiment of this application;

DESCRIPTION OF EMBODIMENTS

Embodiments of this application provide a signal processing system and method to improve computation efficiency of an NN.

To make the technical solutions in the embodiments of this application more comprehensible, the following describes the technical solutions in the embodiments of this application with reference to the accompanying drawings in the embodiments of this application. The described embodiments are merely some but not all of the embodiments of this application.

In the embodiments of the specification, claims, and accompanying drawings of this application, the terms "first", "second", "third" and so on are intended to distinguish between similar objects but do not necessarily indicate a specific order or sequence. Moreover, the terms "include", "contain" and any other variants mean to cover the non-exclusive inclusion, for example, a process, a method, a system, a product, or a device that includes a list of steps or units is not necessarily limited to those steps or units, but may include other steps or units not expressly listed or t to such a process, method, system, product, or device.

Figure 1:
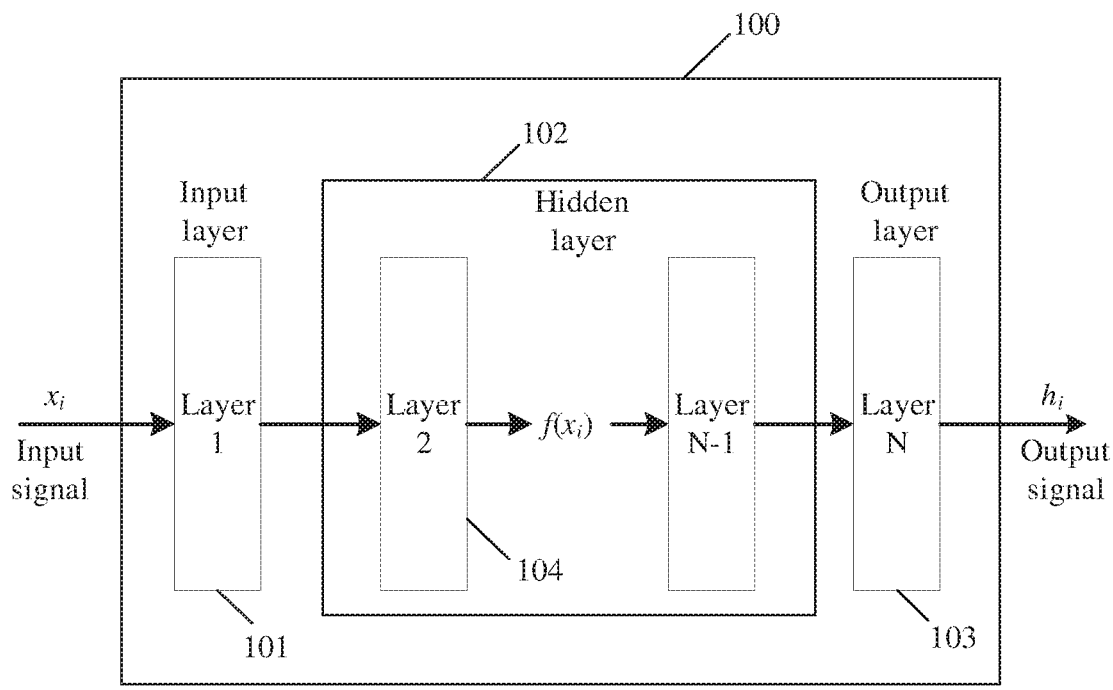
FIG. 1 is a schematic principle diagram of an NN according to an embodiment of this application.

FIG. 1 is a schematic principle diagram of an NN 100. The NN 100 has N processing layers, where N≥3 and N is a natural number. A first layer of the NN 100 is an input layer 101, responsible for receiving an input signal. A last layer of the NN 100 is an output layer 103, which outputs a processing result of the NN 100. Except the first and last layers, other layers are intermediate layers 104. These intermediate layers 104 jointly constitute a hidden layer 102. Every intermediate layer 104 at the hidden layer 102 may receive an input signal and also output a signal. The hidden layer 102 is responsible for processing the input signal. Every layer represents a logical level of signal processing. Through a plurality of layers, a data signal may be processed by multi-level logic.

For ease of understanding, e following describes a processing principle of the NN is embodiment of this application. A processing function of the NN is usually a non-linear function $f(x_i)$ for example, $f(x_i)=\max(0,x_i)$. In some feasible embodiments, the processing function may be an activation function, for example, a rectified linear units function, a hyperbolic tangent function (tan h), or a sigmoid function (sigmoid). It is assumed that $(x_1,x_2,x_3)$ is a one-dimensional input signal matrix, $(h_1,h_2,h_3)$ is an output signal matrix, $w_{ij}$ represents a weight coefficient between an input $x_j$ and an output $h_j$, and a matrix constituted by weight coefficients is a weight matrix. Then, a weight matrix W corresponding to the one-dimensional input signal matrix and the output signal matrix is shown in formula (1):

$$W = \begin{pmatrix} w_{11} & w_{12} & w_{13} \\ w_{21} & w_{22} & w_{23} \\ w_{31} & w_{32} & w_{33} \end{pmatrix}. \quad (1)$$

A relationship between an input signal and an output signal is shown in formula (2), where $b_i$ is a bias of an NN processing function. The bias is used to adjust an input of the NN to obtain an ideal output result:

$$h_1=f(W_{11}x_1+W_{12}x_2+W_{13}x_3+b_1)$$

$$h_2=f(W_{21}x_1+W_{22}x_2+W_{23}x_3+b_2).$$

$$h_3=f(W_{31}x_1+W_{32}x_2+W_{33}x_3+b_3) \quad (2)$$

In some feasible embodiments, the input signal of the NN may be a signal in various forms, for example, a voice signal, a text signal, an image signal, or a temperature signal. The voice signal may be a voice signal recorded by a recording device, a voice signal received by a mobile phone or a fixed phone during a call, a voice signal received by a radio or sent by a radio station, or the like. The text signal may be a TXT text signal, a Word text signal, a portable document format (PDF) text signal, or the like. The image signal may be a scenery signal captured by a camera, an image signal of a community environment captured by a monitoring device, a human face signal captured by an access control system, or the like. The input signal of the NN includes other types of engineering signals that can be processed by computers, which are not listed herein. Processing performed at the hidden layer 102 of the NN may be removing a noise signal from the voice signal to enhance the voice signal, interpreting specific content in the text signal, recognizing the human face image signal, and the like.

Figure 2:
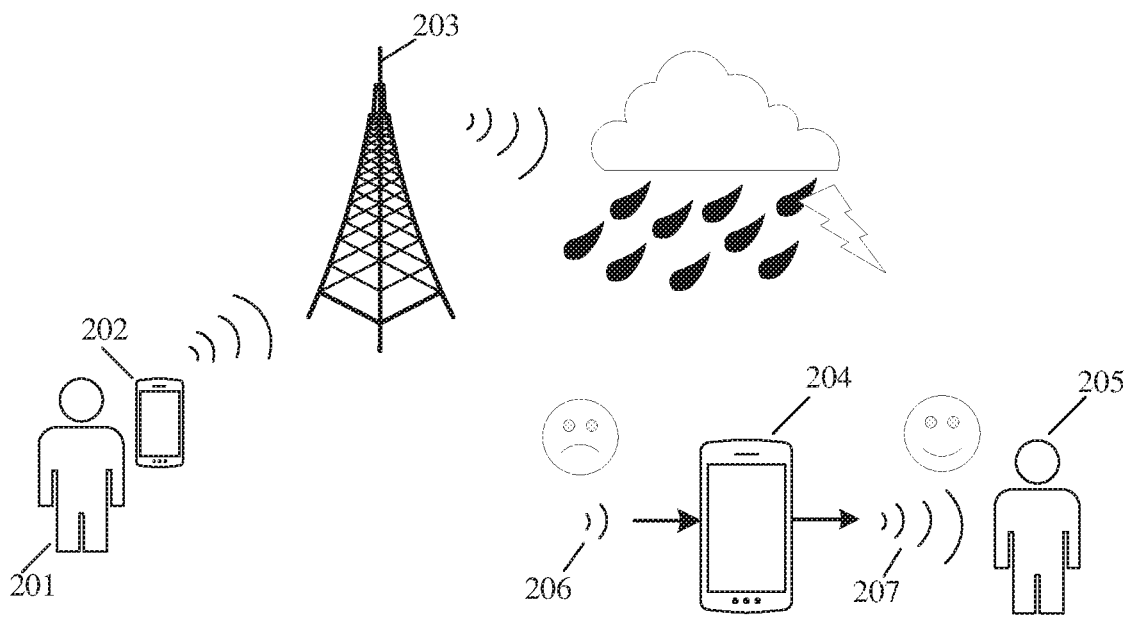
FIG. 2 is a specific implementation scenario of an NN according to an embodiment of this application.

An embodiment of this application provides a specific implementation scenario of the NN 100. As shown in FIG. 2, a mobile smartphone user 201 initiates a voice call to a mobile smartphone user 205. A voice signal is transmitted by a mobile smartphone 202, and transferred to a mobile smartphone 204 through a base station 203. When the voice call is initiated, it rains heavily, accompanied by strong lightning and thunder. As a result, an input signal 206 is seriously weakened and includes large noise. The input signal 206 may be a one-dimensional digital voice signal. The mobile smartphone 204 is equipped with an NN 100. The NN 100 may be implemented on a chip in a form of a dedicated circuit, or may be a program instruction that is run on a central processing unit (CPU) or another processor. After the input signal 206 is processed on the NN 100 of the smartphone 204, an output signal 207 is obtained. The processing includes removing noise, enhancing a valid signal, and the like. The output signal completely retains voice information transmitted by the calling user and avoids interference of the bad natural environment to the signal.

Figure 3:
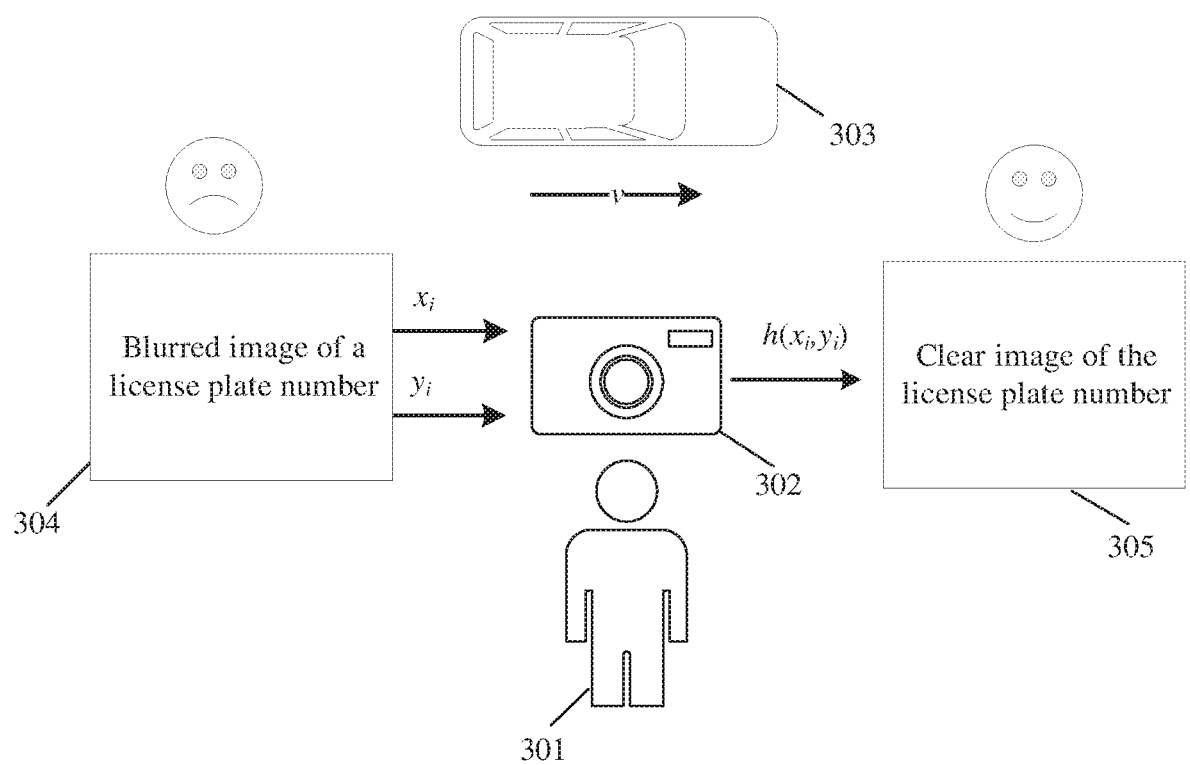
FIG. 3 is a specific implementation scenario of another NN according to an embodiment of this application.

An embodiment of this application provides another specific implementation scenario of the NN 100. As shown in FIG. 3, a car 303 is driving at a high speed. A passer-by 301 captures a license plate number of the car 303 using a digital camera 302. However, because the car 303 has a relatively high speed v, motion blurring occurs in an input signal 304 of the digital camera 302. The input signal 304 is a two-dimensional digital image signal. The digital camera 302 is equipped with an NN 100. The NN 100 may be implemented on a chip in a form of a dedicated circuit, or may be a software module running on an image signal processor. After the input signal 304 is processed on the NN 100 of the digital camera 302, an output signal 305 is obtained. The processing includes estimating a car motion model, removing motion blur, and the like. Definition of license plate number information included in the output signal 305 is improved, and the license plate number can be identified accurately.

Figure 4:
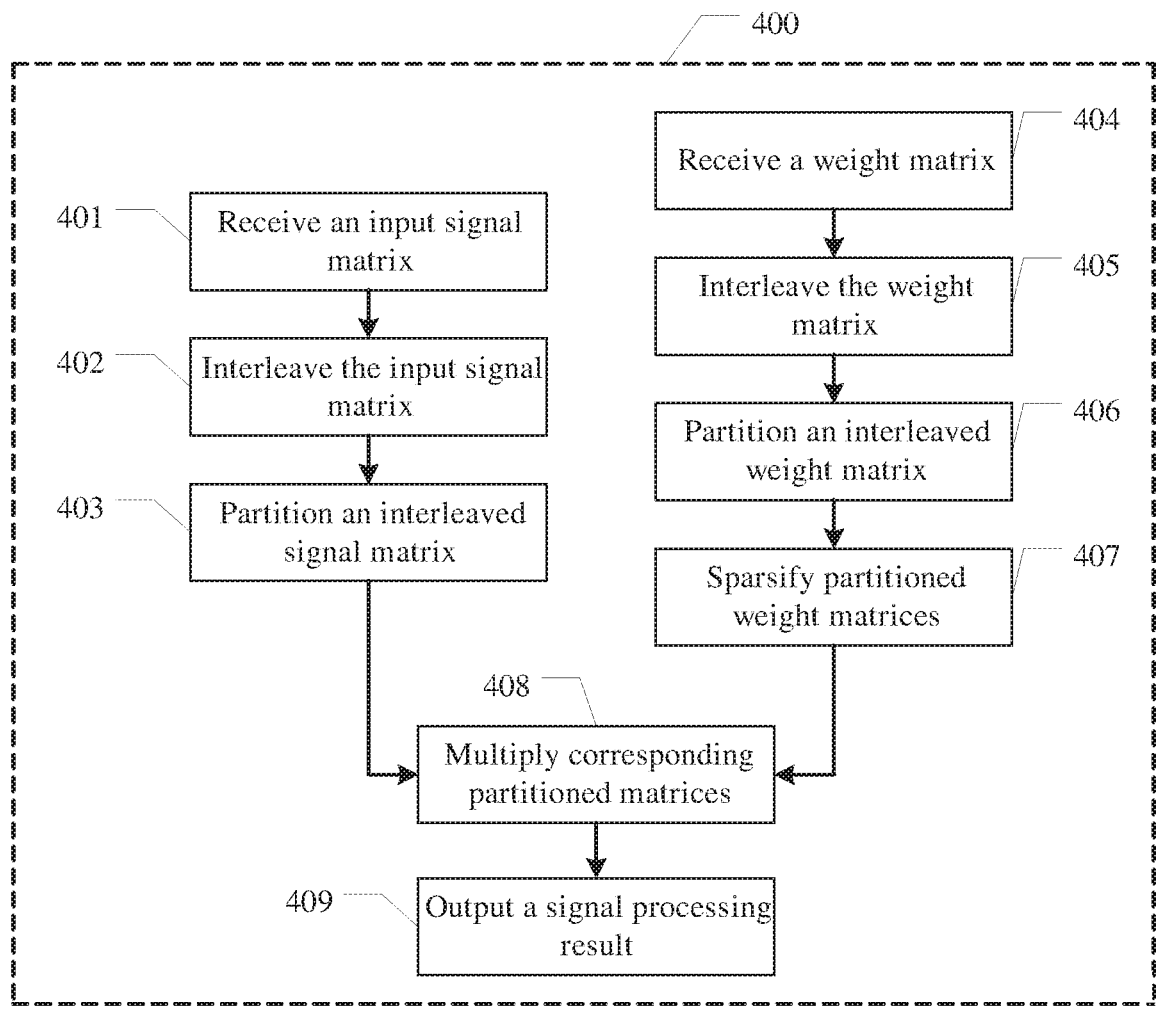
FIG. 4 is a schematic flowchart of a signal processing method according to an embodiment of this application.

For ease of understanding, the following describes a specific signal processing method in the embodiments of this application. As shown in FIG. 4, 400 is a schematic flowchart of the signal processing method. This signal processing method may be performed at any intermediate layer 104 of the hidden layer 102 of the NN 100 shown in FIG. 1.

Step 401: Receive an input signal matrix.

In this embodiment of this application, the input signal matrix comes from the input layer of the NN or an upper intermediate layer of an intermediate layer at which signal processing is performed. The input signal may be any type of signal that can be collected and processed, for example, a voice signal, a text signal, an image signal, or a temperature signal. The matrix may be a one-dimensional column vector, a one-dimensional row vector, a two-dimensional matrix such as a gray-scale image, a three-dimensional matrix such as a red-green-blue (RGB) color image, or the like.

Step 402: Interleave the input signal matrix.

Figures 5A, 5B, 5C:
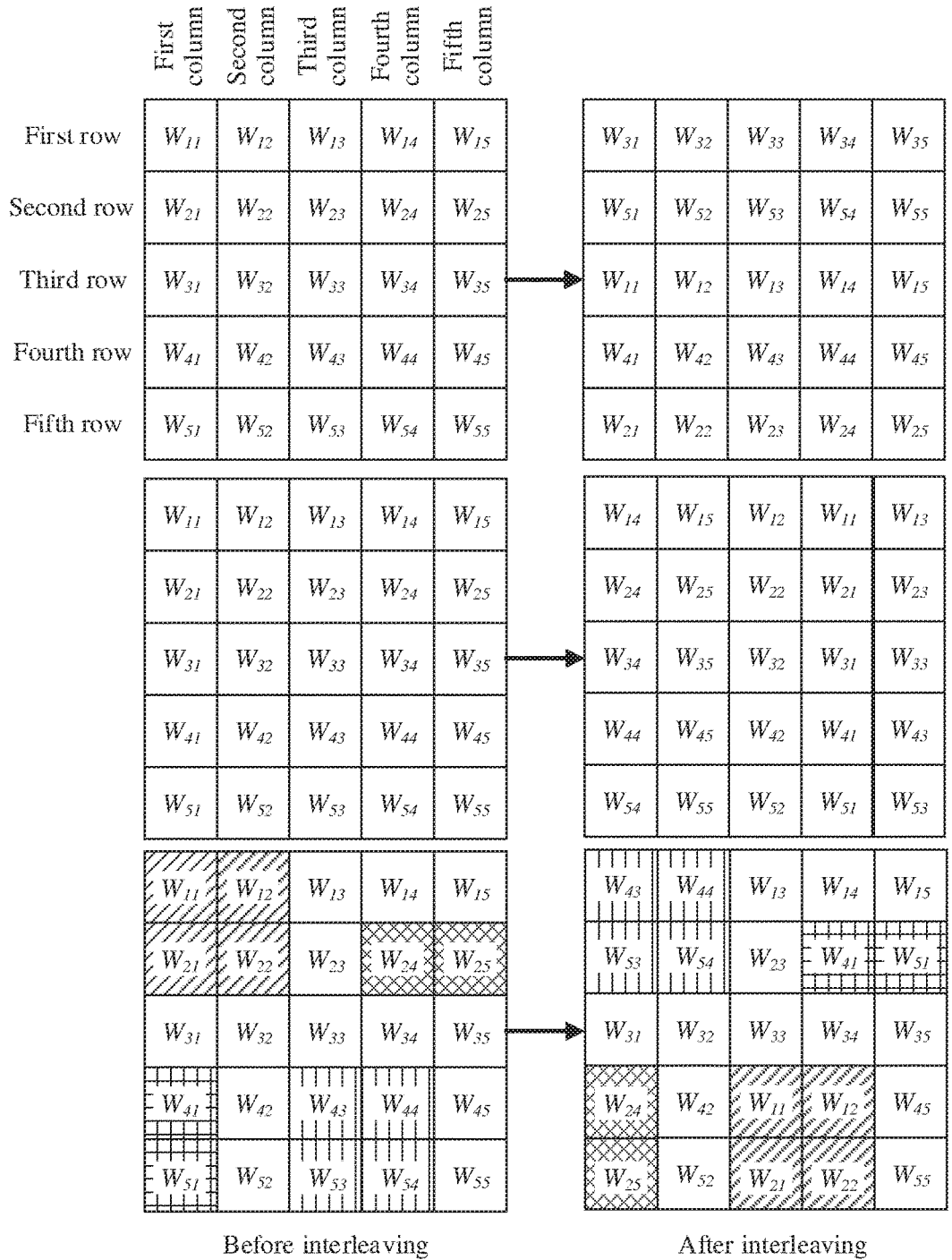
FIGS. 5A, 5B and 5C are schematic diagrams of an interleaving process according to an embodiment of this application.

In this embodiment of this application, interleaving means reorganizing elements in a matrix according to a specific rule to change a storage order of the matrix elements so that an arrangement of non-zero elements in the reorganized matrix tends to be even. FIGS. 5A-5C are schematic diagrams of three interleaving processes. In FIG. 5A, the first row and the third row of an original matrix are exchanged, the second row and the fifth row are exchanged, and the fourth row remains unchanged. In FIG. 5B, the first column and the fourth column of an original matrix are exchanged, the second column is changed to the third column, the third column is changed to the fifth column, and the fifth column is changed to the second column. In FIG. 5C, matrix blocks $(W_{11}, W_{12}, W_{21}, W_{22})$ and $(W_{43}, W_{44}, W_{53}, W_{54})$ are exchanged, and a column block $(W_{41}, W_{51})$ and a row block $(W_{24}, W_{25})$ are exchanged. There are many possibilities for a reorganization rule. The foregoing interleaving examples are only examples of the reorganization rule, instead of a restriction on the interleaving rule.

This embodiment of this application provides a schematic diagram of a comparison between computation load ratios of a plurality of processor cores within a processor before and after interleaving. As shown in FIG. 6, before interleaving, non-zero weight coefficients in a weight matrix are concentrated on the second to fourth rows. Therefore, computation loads of processor cores 2 to 4 are relatively large, whereas computation loads of processor cores 1 and 5 are relatively small. Uneven distribution of the computation loads leads to low utilization of a computing resource, and therefore reduces computation efficiency of the NN. After interleaving, distribution of the non-zero weight coefficients in the weight matrix tends to be even, and the computation load is equal on each processor core. The computing resource is fully utilized, and computation efficiency of the NN increases.

Step 403: Partition an interleaved signal matrix.

In this embodiment of this application, a plurality of partitioned signal matrices is obtained in this step. Partitioning means that a matrix is partitioned into a plurality of subblocks. The subblocks obtained through partitioning may have a same size or different sizes, and a shape of each subblock is not limited to rectangle. An original input signal matrix usually has a large dimension. If operations are directly performed on the large matrix, a large computation load is incurred and a huge processor bandwidth is needed. If the large matrix is partitioned into a plurality of sub-blocks and the plurality of sub-blocks are distributed to a plurality of computing units in the processor, such as cores, parallel processing can improve computation efficiency of the processor while reducing the computation load.

FIGS. 7A-7C are schematic diagrams of two partitioning processes according to an embodiment of this application. FIG. 7A shows two matrices that satisfy a matrix multiplication rule. The matrix multiplication rule is that a quantity of columns of a first matrix participating in matrix multiplication must be equal to a quantity of rows of a second matrix participating in matrix multiplication. In FIG. 7B, a first matrix participating in matrix multiplication is partitioned into two 1×5 row vectors, and correspondingly, a second matrix participating in matrix multiplication is partitioned into two 5×2 submatrices. In this manner, two groups of matrix subblocks are obtained, and the corresponding matrix subblocks satisfy the matrix multiplication rule. In FIG. 7C, a first matrix participating in matrix multiplication is partitioned into two subblocks with different sizes, where a first subblock includes the first column and the second column of the original first matrix, and a second subblock includes the third to the fifth columns of the original first matrix, and correspondingly, a second matrix participating in matrix multiplication is also partitioned into two subblocks with different sizes, where a first subblock includes the first row and the second row of the original second matrix, and a second subblock includes the third to the fifth rows of the original second matrix. The corresponding matrix subblocks in the two groups satisfy the matrix multiplication rule.

FIG. 8 is a schematic diagram of another partitioning process according to an embodiment of this application. Subblocks obtained through this partitioning process are not rectangles. Elements in the obtained subblocks are combined into a matrix with a new dimension so that subblock matrices participating in matrix multiplication satisfy the matrix multiplication rule.

Step 404: Receive a weight matrix. In this embodiment of this application, the weight matrix includes weight coefficients, and the weight matrix is defined by the NN.

Step 405: Interleave the weight matrix. A correspondence exists between the weight matrix and the input signal matrix. An interleaving operation is performed on the input signal. Therefore, to ensure that the interleaving does not change characteristic distribution of an output result, the weight matrix also needs to be interleaved. For the interleaving, refer to a definition of interleaving in the foregoing input signal matrix and the specific embodiments of interleaving provided in FIG. 5 and FIG. 6. Details are not described herein.

Step 406: Partition an interleaved weight matrix to obtain a plurality of partitioned weight matrices. A weight matrix corresponding to the NN usually has a relatively large dimension. If operations are directly performed on the original weight matrix, a large computation load is incurred and a huge processor bandwidth is needed. If the large matrix is partitioned into a plurality of sub-blocks and the plurality of sub-blocks are distributed to a plurality of computing units for parallel processing, computation efficiency can be improved while reducing the computation load of the processor. In addition, the original input signal matrix and the original weight matrix satisfy the matrix multiplication rule. After the input signal matrix is partitioned, the weight matrix also needs to be partitioned to satisfy the matrix multiplication rule. The partitioning is required to enable the interleaved weight matrix to satisfy two conditions after being partitioned. 1. A quantity of partitioned weight matrices is equal to a quantity of partitioned signal matrices. 2. The partitioned weight matrices and the partitioned signal matrices satisfy the matrix multiplication rule.

Step 407: Sparsify the partitioned weight matrices, that is, sparsify the plurality of partitioned weight matrices to obtain a plurality of sparsified partitioned weight matrices. As mentioned in the foregoing description, the weight matrix of the NN usually has a large dimension. However, among thousands of weight coefficients, a proportion of key weight coefficients is usually small. Most weight coefficients are close to zero, and play a small role in subsequent processing of the NN. Therefore, a threshold may be set so that a weight coefficient below the threshold is set to zero, and a weight coefficient above the threshold remains unchanged. This processing is called sparsification. A sparsified weight matrix retains only key weight information, which greatly reduces a subsequent computation load. Many sparsification solutions are available, for example, local sparsification and global sparsification. A threshold selected in the sparsification solution may be fixed or adaptive. There may be one or more thresholds in a same sparsification process.

Step 408: Multiply corresponding partitioned matrices. Perform matrix multiplication on the plurality of sparsified partitioned weight matrices obtained in step 407 and the plurality of partitioned signal matrices obtained in step 403 to obtain a plurality of matrix multiplication results. Further, as mentioned in the foregoing description, the quantity of partitioned weight matrices is equal to the quantity of partitioned signal matrices, that is, each partitioned weight matrix has a partitioned signal matrix corresponding to the portioned weight matrix, and both satisfy the matrix multiplication rule. Matrix multiplication is performed on each sparsified partitioned weight matrix and the partitioned signal matrix corresponding to the sparsified partitioned weight matrix to obtain a matrix multiplication result. Each matrix multiplication result includes a plurality of output signals that can be processed by a computer. In addition to the cases listed in FIG. 7 and FIG. 8, there are also many other types of correspondence between the partitioned weight matrices and the partitioned signal matrices, provided that both satisfy the matrix multiplication rule.

Step 409: Output a signal processing result. The signal processing result includes the multiplication results of the plurality of partitioned matrices. The results of the portioned matrices may be one-dimensional column vectors, one-dimensional row vectors, two-dimensional matrices (for example, grayscale images), three-dimensional matrices (for example, RGB color images), or the like. The output signal may be any type of signal that corresponds to the input signal and can be processed, played, or displayed, for example, a voice signal, a text signal, an image signal, or a temperature signal. The signal processing result goes to a lower intermediate layer of an intermediate layer where signal processing is performed, or to an output layer of the NN.

It should be noted that, in the embodiment corresponding to FIG. 4, there is no strict chronological order between the processing of the input signal matrix, for example, any one or more steps of 401 to 403, and the processing of the weight matrix, for example, any one or more steps of 404 to 407. For example, steps 401 to 403 may be performed concurrently with steps 404 to 407, or there is no strict execution sequence.

The foregoing describes a signal processing method in the embodiments of this application. The following describes another signal processing method in the embodiments of this application.

Figure 9:
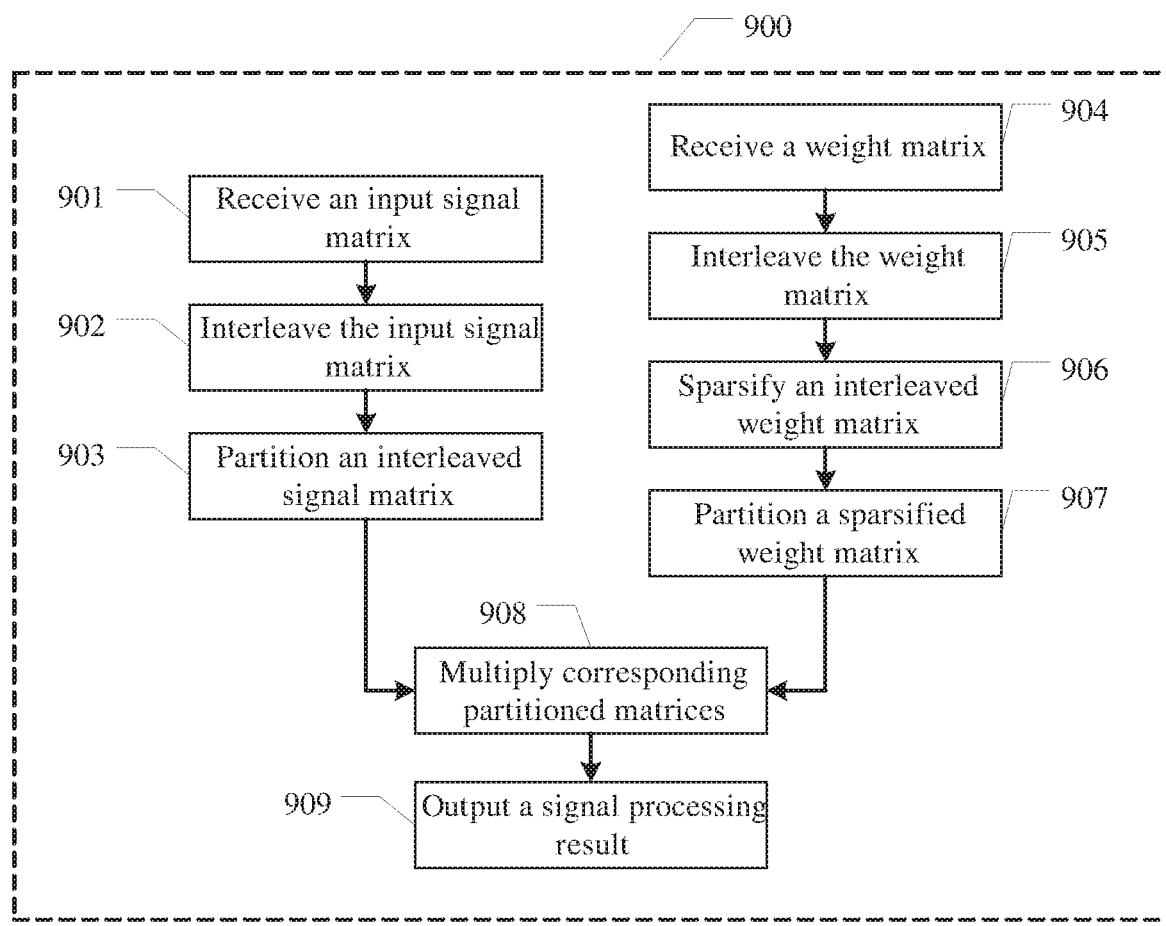
FIG. 9 is a schematic flowchart of a signal processing method according to an embodiment of this application.

As shown in FIG. 9, 900 is a schematic flowchart of the signal processing method. This signal processing method may be performed at any intermediate layer 104 of the hidden layer 102 of the NN 100 shown in FIG. 1.

Step 901: Receive an input signal matrix. This step is the same as step 401 in the foregoing signal processing method embodiment. For details, refer to the descriptions about part 401.

Step 902: Interleave the input signal matrix. For details about this step, refer descriptions about part 402.

Step 903: Partition an interleaved signal matrix. For details about this step, refer to the descriptions about part 403.

Step 904: Receive a weight matrix. For details about this step, refer to the descriptions about part 404.

Step 905: Interleave the weight matrix. For details about this step, refer to the descriptions about part 405.

Step 906: Sparsity an interleaved weight matrix to obtain a sparsified interleaved weight matrix. A difference between this step and the foregoing signal processing method embodiment is that the interleaved weight matrix is first sparsified and then partitioned in this signal processing method embodiment. For details about the sparsification, refer to the descriptions about part 407 in the foregoing signal processing method embodiment.

Step 907: Partition the sparsified weight matrix to obtain a plurality of sparsified partitioned weight matrices. A difference between this step and the foregoing signal processing method embodiment is that the interleaved weight matrix is first sparsified and then partitioned in this signal processing method embodiment. For details about a partitioning rule, refer to the descriptions about part 406 in the foregoing signal processing method embodiment.

Step 908: Multiply corresponding partitioned matrices. For details about this step, refer to the descriptions about part 408.

Step 909: Output a signal processing result. For details about this step, refer to the descriptions about part 409.

For some specific processes in the embodiment corresponding to FIG. 9, refer to the similar descriptions in the embodiment corresponding to FIG. 4.

After the signal processing methods in the embodiments of this application are described, the following describes a signal processing apparatus according to an embodiment of this application.

Figure 10:
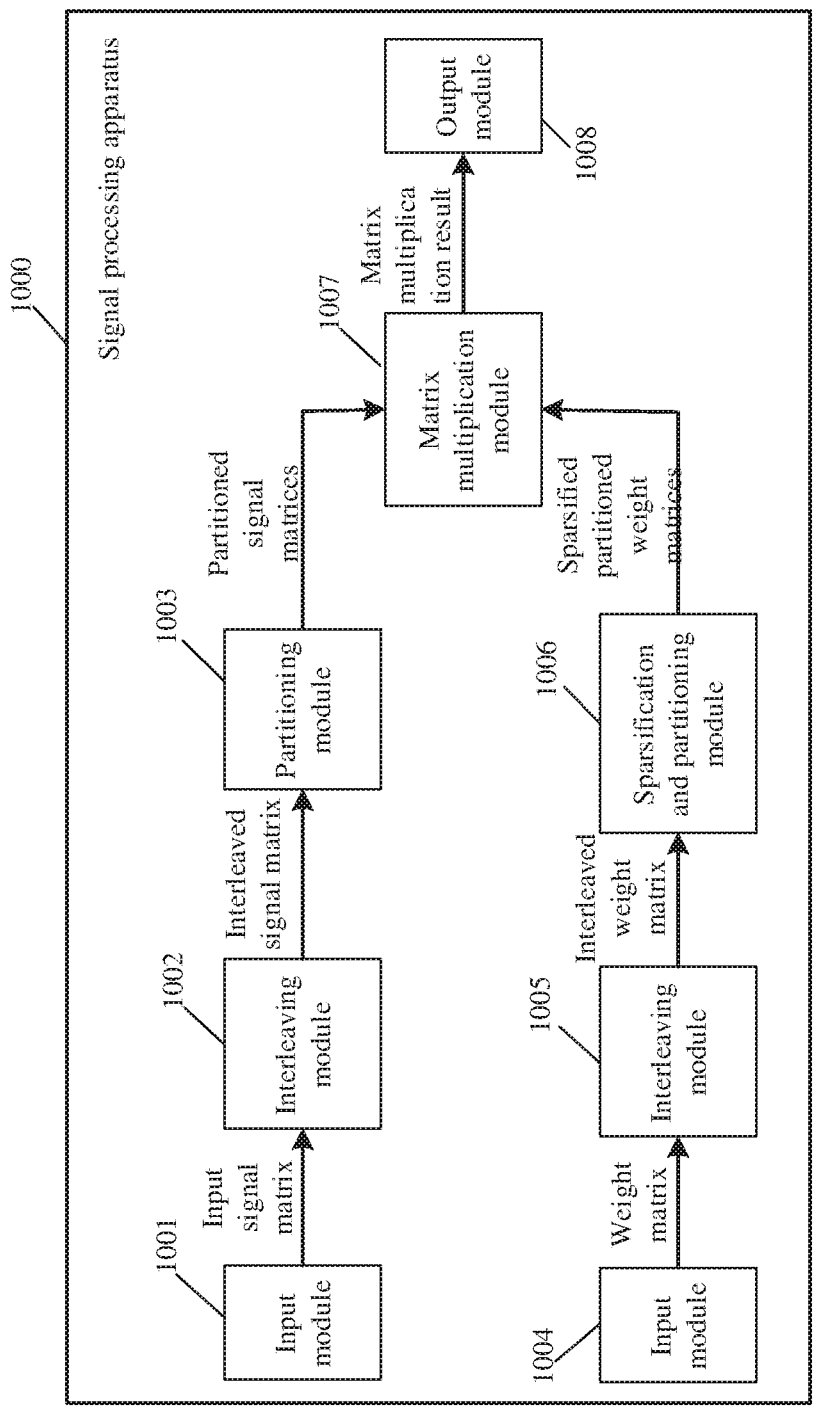
FIG. 10 is a schematic diagram of a signal processing apparatus according to an embodiment of this application.

As shown in FIG. 10, an embodiment of this application provides a signal processing apparatus 1000. The signal processing apparatus 1000 includes the following modules.

An input module 1001 is configured to receive an input signal matrix.

An interleaving module 1002 is configured to interleave the input signal matrix to obtain an interleaved signal matrix.

A partitioning module 1003 is configured to partition the interleaved signal matrix to obtain a plurality of partitioned signal matrices.

An input module 1004 is configured to receive a weight matrix, where the weight matrix includes weight coefficients. For details about the weight matrix, refer to the descriptions about part 404.

An interleaving module 1005 is configured to interleave the weight matrix to obtain an interleaved weight matrix.

A sparsification and partitioning module 1006 is configured to perform sparsification and partitioning on the interleaved weight matrix to obtain a plurality of sparsified partitioned weight matrices.

Figure 11A:
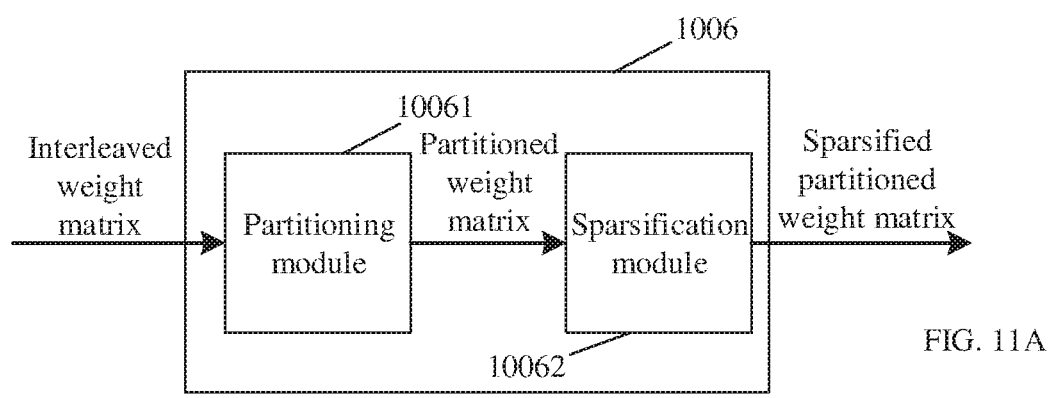
FIGS. 11A and 11B are schematic diagrams of a sparsification and partitioning module of the signal processing apparatus in FIG. 10.
Figure 11B:
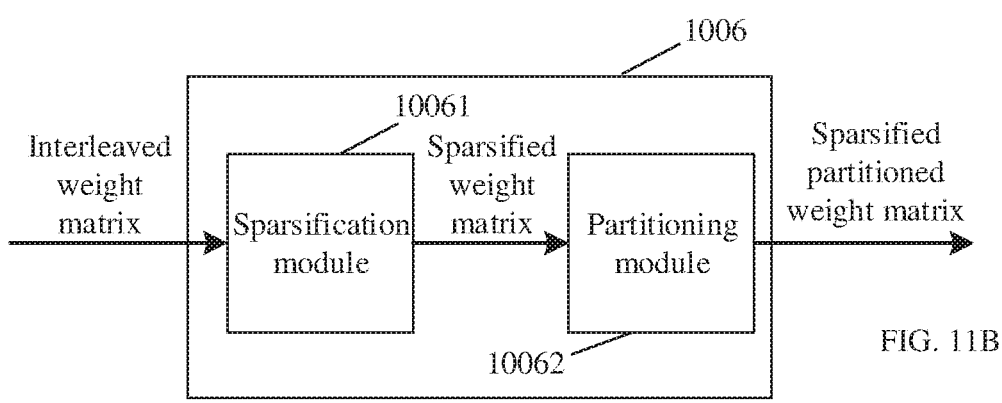

In some feasible embodiments, the sparsification and partitioning module 1006 has two different constitutions, as shown in FIGS. 11A and 11B. FIG. 11A shows a constitution of the sparsification and partitioning module 1006, which includes a partitioning module 10061 and a sparsification module 10062. The partitioning module 10061 is located before the sparsification module 10062. After the interleaved weight matrix is received, the interleaved weight matrix is first partitioned to obtain a plurality of partitioned weight matrices, and then, the plurality of partitioned weight matrices are sparsified to obtain a plurality of sparsified partitioned weight matrices. FIG. 11B shows another constitution of the sparsification and partitioning module 1006, which includes a sparsification module 10063 and a partitioning module 10064. The sparsification module 10063 is located before the partitioning module 10064. After the interleaved weight matrix is received, the interleaved weight matrix is first sparsified to obtain a sparsified weight matrix and then, the sparsified weight matrix is partitioned to obtain a plurality of sparsified partitioned weight matrices.

A matrix multiplication module 1007 is configured to perform matrix multiplication on the plurality of sparsified partitioned weight matrices and the plurality of partitioned signal matrices to obtain a plurality of matrix multiplication results, where matrix multiplication is performed on each sparsified partitioned weight matrix and a partitioned signal matrix corresponding to the sparsified partitioned weight matrix to obtain a matrix multiplication result, and each matrix multiplication result includes a plurality of output signals that can be processed by a computer.

An output module 1008 is configured to output a signal processing result, where the signal processing result includes the plurality of matrix multiplication results.

Each of the foregoing modules constituting the signal processing apparatus may be implemented by a hardware function module, a software function module, or a combination thereof. When hardware is used for implementation, at least one module of the apparatus may be a logical module formed by a logic integrated circuit.

The foregoing describes the signal processing apparatus in the embodiments of this application from a perspective of a modular function entity. The following describes a signal processing apparatus in the embodiments of this application from a perspective of processor hardware processing.

Figure 12:
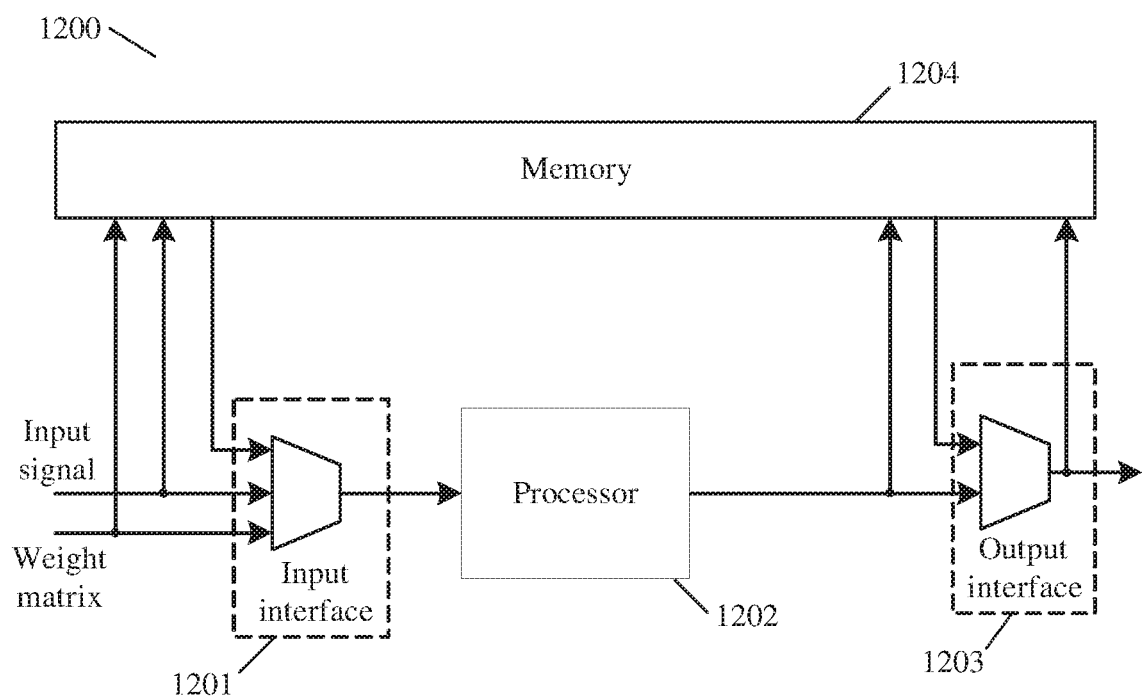
FIG. 12 is a schematic structural diagram of a signal processing apparatus according to an embodiment of this application.

An embodiment of this application provides a signal processing apparatus 1200. As shown in FIG. 12, the signal processing apparatus 1200 includes the following modules.

An input interface 1201 is configured to receive an input signal matrix and/or a weight matrix. The input interface may switch between receiving of the input signal matrix and receiving of the weight matrix using a selector. In some feasible embodiments, the input interface may receive the foregoing input signal matrix or weight matrix through time division multiplexing. In some feasible embodiments, there may be two such input interfaces, respectively receiving the input signal matrix and receiving the weight matrix, for example, concurrently receiving the input signal matrix and the weight matrix.

A processor 1202 is configured to process functions in steps 402 to 408 of the foregoing signal processing method. In some feasible embodiments, the processor 1202 may be a single-processor structure, a multi-processor structure, a single-thread processor, multi-thread processor, or the like. In some feasible embodiments, the processor 1202 may be integrated in an application-specific integrated circuit, or may be a processor circuit independent of the integrated circuit.

An output interface 1203 is configured to output a signal processing result in the foregoing signal processing method. In some feasible embodiments, the signal processing result may be directly output by the processor, or may be stored in a memory and then output by the memory. In some feasible embodiments, there may be only one output interface or a plurality of output interfaces. In some feasible embodiments, the signal processing result output by the output interface may be sent to a memory for storage, may be sent to a next signal processing apparatus for further processing, may be sent to a display device for display, may be sent to a player terminal for playing, or the like.

The signal processing apparatus 1200 may further include a memory 1204. The memory may store the foregoing input signal matrix, the signal processing result, the weight matrix, related instructions for configuring the processor, and the like. In some feasible embodiments, there may be one or more memories. The memory may be a floppy disk, a hard disk such as a built-in hard disk or a removable hard disk, a magnetic disk, a compact disc, a magneto-optical disk such as a compact-disc (CD) read-only memory (ROM) or a digital versatile disc (DVD) ROM, a nonvolatile storage device such as a random access memory (RAM), a ROM, a programmable ROM (PROM), an erasable PROM (EPROM), an electrically EPROM (EEPROM), or a flash memory, or any other form of storage medium well-known in the art.

The foregoing components of the signal processing apparatus provided in this embodiment of this application are configured to implement functions corresponding to the steps in the foregoing signal processing method. The steps have been described in detail in the foregoing signal processing method embodiment, and are not described herein again.

An embodiment of this application further provides a computer-readable storage medium, where the computer-readable storage medium stores an instruction, and when the instruction is run on a computer, the computer is enabled to perform one or more of steps 401 to 409 in the foregoing signal processing method. When the modules in the foregoing signal processing apparatus are implemented in the form of a software function unit and sold or used as an independent product, the unit may be stored in the computer-readable storage medium. Based on such an understanding, an embodiment of this application further provides a computer program product including an instruction. The technical solutions in this application essentially, or the part contributing to other approaches, or some or all of the technical solutions may be implemented in a form of a software product. The computer software product is stored in a storage medium, and includes several instructions for instructing a computer device (which may be a personal computer, a server, a network device, or the like) or a processor in the computer device to perform all or some of the steps of the methods described in the embodiments of this application. For types of the storage medium, refer to the types of memory in the descriptions about the memory 1204.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal processing method, comprising:
   receiving, at an input layer of a neural network (NN), a plurality of to-be-processed digital signals at are capable of processing by one or more computers;
   receiving, at a hidden layer of the NN, an input signal matrix from the input layer or an intermediate layer of the NN, wherein the input signal matrix comprises the plurality of to-be-processed digital signals;
   interleaving, at the hidden layer of the neural network, the input signal matrix to obtain an interleaved signal matrix;
   partitioning the interleaved signal matrix to obtain a plurality of partitioned signal matrices;
   receiving a weight matrix, wherein the weight matrix comprises a plurality of weight coefficients;
   interleaving the weight matrix to obtain an interleaved weight matrix with substantially even distribution of non-zero weight coefficients;
   processing the interleaved weight matrix to obtain a plurality of sparsified partitioned weight matrices;
   performing matrix multiplication on the sparsified partitioned weight matrices and the partitioned signal matrices to obtain a plurality of matrix multiplication results, wherein the matrix multiplication is performed on a sparsified partitioned weight matrix and a partitioned signal matrix corresponding to the sparsified partitioned weight matrix to obtain a matrix multiplication result, and wherein each of the matrix multiplication results comprises a plurality of digital output signals that are capable of processing by the one or more computers; and
   outputting a signal processing result comprising the matrix multiplication results to an output layer or the intermediate layer of the NN.

2. The signal processing method of claim 1, wherein processing the interleaved weight matrix to obtain the sparsified partitioned weight matrices comprises:
   partitioning the interleaved weight matrix to obtain a plurality of partitioned weight matrices; and
   sparsifying the partitioned weight matrices to obtain the sparsified partitioned weight matrices.

3. The signal processing method of claim 1, wherein processing the interleaved weight matrix to obtain the sparsified partitioned weight matrices comprises:
   sparsifying the interleaved weight matrix to obtain a sparsified weight matrix; and
   partitioning the sparsified weight matrix to obtain the sparsified partitioned weight matrices.

4. The signal processing method of claim 1, wherein interleaving the input signal matrix and interleaving the weight matrix comply with a same interleaving rule.

5. The signal processing method of claim 1, wherein the to-be-processed digital signals comprise at least one of a voice signal, a text signal, or an image signal.

6. The signal processing method of claim 5, wherein when the to-be-processed digital signals comprise the voice signal, the signal processing method removes a noise signal from the voice signal to enhance the voice signal.

7. The signal processing method of claim 5, wherein when the to-be-processed digital signals comprise the image signal, the signal processing method recognizes a human face image signal from the image signal.

8. A neural network (NN) signal processing apparatus comprising:
   an input interface configured to:
     receive an input signal matrix from an input layer or an intermediate layer of the NN, wherein the input signal matrix comprises a plurality of to-be-processed digital signals that are capable of processing by a computer; and
     receive a weight matrix, wherein the weight matrix comprises a plurality of weight coefficients;
   a processor coupled to the input interface and configured to:
     interleave the input signal matrix to obtain an interleaved signal matrix with substantially even distribution of non-zero weight coefficients;
     partition the interleaved signal matrix to obtain a plurality of partitioned signal matrices;
     interleave the weight matrix to obtain an interleaved weight matrix;
     process the interleaved weight matrix to obtain a plurality of sparsified partitioned weight matrices; and
     perform matrix multiplication on the sparsified partitioned weight matrices and the partitioned signal matrices to obtain a plurality of matrix multiplication results, wherein the matrix multiplication is performed on a sparsified partitioned weight matrix and a partitioned signal matrix corresponding to the sparsified partitioned weight matrix to obtain a matrix multiplication result, and wherein each of the matrix multiplication results comprises a plurality of digital output signals that are capable of processing by the computer; and
   an output interface coupled to the processor and configured to output a signal processing result comprising the matrix multiplication results to an output layer or the intermediate layer of the NN.

9. The signal processing apparatus of claim 8, wherein the processor is specifically configured to:
   partition the interleaved weight matrix to obtain a plurality of partitioned weight matrices; and
   sparsify the partitioned weight matrices to obtain the sparsified partitioned weight matrices.

10. The signal processing apparatus of claim 8, wherein the processor is specifically configured to:

sparsify the interleaved weight matrix to obtain a sparsified weight matrix; and
partition the sparsified weight matrix to obtain the sparsified partitioned weight matrices.

11. The signal processing apparatus of claim 8, wherein interleaving the input signal matrix and interleaving the weight matrix comply with a same interleaving rule.

12. The signal processing apparatus of claim 8, wherein the to-be-processed digital signals comprise at least one of a voice signal, a text signal, or an image signal.

13. A computer program product comprising computer-executable instructions for storage on a non-transitory computer-readable storage medium that, when executed by a processor, cause a neural network (NN) signal processing apparatus to:
receive, at an input layer or an intermediate layer of the NN, a plurality of to-be-processed digital signals that are capable of processing by one or more computers;
receive an input signal matrix from the input layer or the intermediate layer, wherein the input signal matrix comprises the plurality of to-be-processed digital signals;
interleave the input signal matrix to obtain an interleaved signal matrix with substantially even distribution of non-zero weight coefficients;
partition the interleaved signal matrix to obtain a plurality of partitioned signal matrices;
receive a weight matrix, wherein the weight matrix comprises a plurality of weight coefficients;
interleave the weight matrix to obtain an interleaved weight matrix;
process the interleaved weight matrix to obtain a plurality of sparsified partitioned weight matrices;
perform matrix multiplication on the sparsified partitioned weight matrices and the partitioned signal matrices to obtain a plurality of matrix multiplication results, wherein the matrix multiplication is performed on a sparsified partitioned weight matrix and a partitioned signal matrix corresponding to the sparsified partitioned weight matrix to obtain a matrix multiplication result, and wherein each of the matrix multiplication results comprises a plurality of digital output signals that are capable of processing by the computer; and
output a signal processing result comprising the matrix multiplication results to an output layer or the intermediate layer of the NN.

14. The computer program product of claim 13, wherein the computer-executable instructions specifically cause the signal processing apparatus to:
partition the interleaved weight matrix to obtain a plurality of partitioned weight matrices; and
sparsify the partitioned weight matrices to obtain the sparsified partitioned weight matrices.

15. The computer program product of claim 13, wherein the computer-executable instructions specifically cause the signal processing apparatus to:
sparsify the interleaved weight matrix to obtain a sparsified weight matrix; and
partition the sparsified weight matrix to obtain the sparsified partitioned weight matrices.

16. The computer program product of claim 13, wherein interleaving the input signal matrix and interleaving the weight matrix comply with a same interleaving rule.

17. The computer program product of claim 13, wherein the to-be-processed digital signals comprise at least one of a voice signal, a text signal, or an image signal.

* * * * *

UNITED STATES PATENT AND TRADEMARK OFFICE
CERTIFICATE OF CORRECTION

PATENT NO. : 11,568,225 B2
APPLICATION NO. : 16/705464
DATED : January 31, 2023
INVENTOR(S) : Ruosheng Xu It is certified that error appears in the above-identified patent and that said Letters Patent is hereby corrected as shown below:

In the Claims

Claim 1, Column 13, Line 31: "signals at are" should read "signals that are"

Claim 13, Column 15, Line 21: "intermediate laver, wherein" should read "intermediate layer, wherein"

Signed and Sealed this
Twenty-first Day of March, 2023

Katherine Kelly Vidal
*Director of the United States Patent and Trademark Office*